United States Patent [19]
Fujikubo et al.

[11] 4,327,316
[45] Apr. 27, 1982

[54] BATTERY RECHARGING SOLAR CELL ARRANGEMENT FOR AN AUTOMOTIVE VEHICLE

[75] Inventors: Yoshitake Fujikubo, Zushi; Mamoru Tanaka, Hachioji, both of Japan

[73] Assignee: Nissan Motor Company, Limited, Yokohama, Japan

[21] Appl. No.: 120,030

[22] Filed: Feb. 11, 1980

[30] Foreign Application Priority Data

Feb. 26, 1979 [JP] Japan ............................ 54-22913[U]

[51] Int. Cl.³ .................. H02J 7/00; H01L 31/04; B60L 11/18
[52] U.S. Cl. ........................................ 320/2; 136/291; 180/2 A; 180/65 B
[58] Field of Search .................... 320/2, 61; 180/65 B, 180/2 A; 136/206, 291, 293; 307/66

[56] References Cited

U.S. PATENT DOCUMENTS

| | | | |
|---|---|---|---|
| 3,444,946 | 5/1969 | Waterbury | 180/65 |
| 3,943,726 | 3/1976 | Miller | 180/65 B X |
| 3,971,454 | 7/1976 | Waterbury | 320/56 X |
| 4,080,221 | 3/1978 | Manelas | 320/2 X |
| 4,181,188 | 1/1980 | Dessert | 180/2 A |

FOREIGN PATENT DOCUMENTS

2028739 3/1980 United Kingdom .

OTHER PUBLICATIONS

"The Solarvoltaic Flashlight", Solarex Data Sheet 6504-1, Aug., 1978, Solarex Corp.
"Building Blocks for Solarectricity", 1979, Solarex Corp. Pub., p. 3, Solar Panels.

*Primary Examiner*—Robert J. Hickey
*Attorney, Agent, or Firm*—James C. Wray

[57] ABSTRACT

In a battery recharging arrangement for an automotive vehicle, one or more solar batteries, together with recharging current control means to charge an automotive vehicle battery, are disposed with supporting metal fixtures at a plurality of different positions to which solar energy is applied so as to prevent the rechargeable batteries mounted in an automotive vehicle body from becoming excessively discharged. The solar batteries are positioned on the roof of a vehicle or mainly within the passenger compartment at appropriate elevation angles, so that as long as the vehicle is in the condition wherever solar energy is applied, solar energy can be obtained at any position of the sun regardless of the direction the vehicle is moving in or of the place the vehicle is parked since at least one of the disposed solar batteries will be effectively exposed to sunlight. The solar batteries so disposed at a plurality of different positions within the passenger compartment are protected from dirt or splashes of mud to keep the batteries in good working conditions at all times. In addition, if appropriate light focusing devices, such as Fresnel lenses, are positioned over the solar batteries, the solar energy collecting performance will further be enhanced.

11 Claims, 10 Drawing Figures

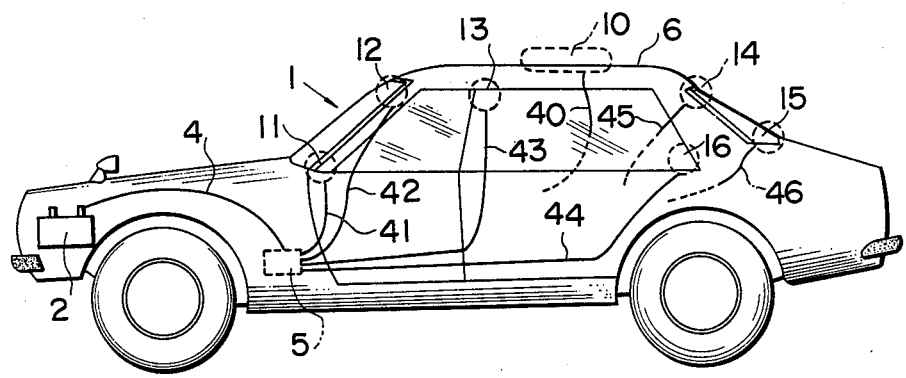
FIG.1
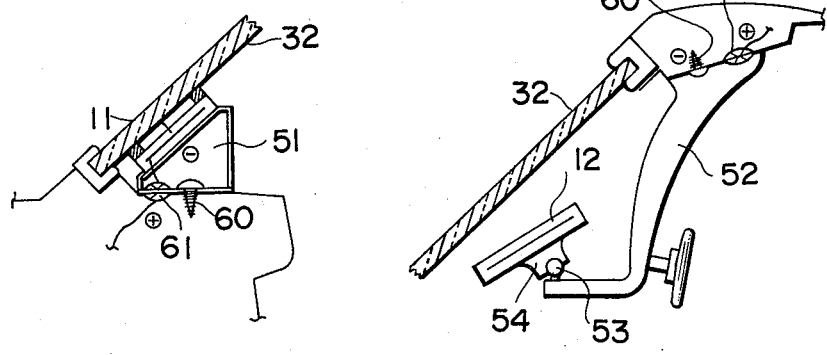
FIG.4
FIG.5
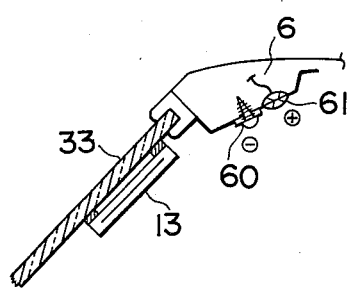
FIG.6
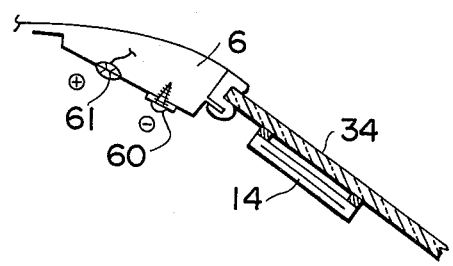
FIG.7

BATTERY RECHARGING SOLAR CELL ARRANGEMENT FOR AN AUTOMOTIVE VEHICLE

BACKGROUND OF THE INVENTION

The present invention relates to a battery recharging arrangement for an automotive vehicle utilizing solar batteries mounted on the vehicle, and more particularly to a battery recharging arrangement for an automotive vehicle to effectively utilize one or more solar batteries disposed at different positions such as on the roof or within the passenger compartment of the vehicle.

Generally, when an automotive vehicle is parked for a long period of time without running or after running at night on a busy road in the rush hour where start-and-stop operations are required repeatedly, the battery voltage drops, then the engine is apt to become difficult to start. In order to avoid such discharge of an automotive vehicle battery, it is very useful to utilize an auxiliary charging system comprising solar batteries. However, it is generally difficult to effectively utilize solar energy whenever the sun shines, because the vehicle may run or be parked in all directions, and the position of the sun varies; that is, the correlation between the vehicle and the sun varies at all times.

In addition to this, there is another problem that dirt or splashes of mud tend to come in contact with the solar battery surfaces, especially when other vehicles are passing the vehicle provided with solar batteries while running at a high speed on a rainy day. Therefore, there has been a need for a battery recharging arrangement for an automotive vehicle so constructed and arranged that solar energy can be effectively utilized whenever the sun is shining, regardless of the direction in which the vehicle is running or parked and the positions of the sun, with the solar battery surfaces kept clean at all times.

SUMMARY OF THE INVENTION

Accordingly, it is an object of the present invention to provide an auxiliary battery recharging arrangement for an automotive vehicle wherein solar batteries are employed so that the battery mounted in an automotive vehicle may be prevented from being discharged even under severe conditions.

It is another object of the present invention to provide a battery recharging arrangement for an automotive vehicle using solar batteries wherein several solar batteries are disposed on the roof or in several different positions within the passenger compartment of an automotive vehicle so that at least one of the solar batteries is directed toward the sun at all times.

It is a further object of the present invention to provide a battery recharging arrangement for an automotive vehicle using solar batteries which are covered by a transparent plate or the like on the roof or in the passenger compartment of an automotive vehicle so that all of the solar battery surfaces may be protected from dirt or splashes of mud.

It is still a further object of the present invention to provide a battery recharging arrangement for an automotive vehicle using solar batteries wherein light focusing devices such as Fresnel lenses or reflecting mirrors are positioned near the solar batteries so that the light-collecting capability may be improved.

According to the present invention, since there are provided several solar batteries on an automotive vehicle, it is possible to effectively obtain solar energy, in order to charge the battery mounted in the automotive vehicle, regardless of the direction of automotive vehicle running or parking and the position of the sun. In addition, if some appropriate light focusing devices are used to cover the solar batteries, the light collecting efficiency will further be increased.

BRIEF DESCRIPTION OF THE DRAWINGS

These and other objects, features and advantages of the present invention will become more apparent from the following description of the preferred embodiments thereof taken in conjunction with the accompanying drawings. Any one reference numeral designates similar or corresponding parts or members in all figures.

FIG. 1 is a schematic side view of an automotive vehicle showing the typical positions at which solar batteries may be disposed.

FIG. 4 is an enlarged vertical longitudinal sectional schematic view of the front windshield glass of a vehicle, showing a solar battery secured to the instrument panel.

FIG. 5 is an enlarged vertical longitudinal sectional schematic view of the front windshield glass of a vehicle, showing a solar battery mounted on a rear-view mirror support with a ball joint.

FIG. 6 is an enlarged vertical lateral sectional schematic view of a side window glass of a vehicle, showing a solar battery fixed inside the glass near the upper end portion of a center pillar.

FIGS. 7, 8, and 9 are enlarged vertical longitudinal sectional schematic views of the rear windshield glass of a vehicle, showing solar batteries fixed inside the upper and lower ends of the rear windshield glass and on the rear shelf.

DETAILED DESCRIPTION OF THE INVENTION

Figure 9:
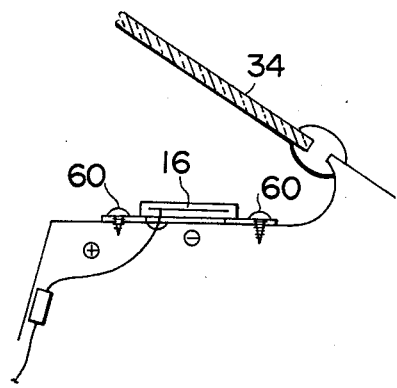

The present invention relates to a battery recharging arrangement for an automotive vehicle, which effectively utilizes at least one of a number of solar batteries disposed at different positions, so that the automotive vehicle battery may be protected against excessive discharge even under severe conditions.

In the attached drawings is shown a preferred embodiment of the present invention.

A schematic illustration of a battery recharging arrangement according to the present invention is presented in FIG. 1. An automotive vehicle body 1 includes a battery 2. A rechargeable battery arrangement used as an auxiliary charging system for a vehicle battery is provided with recharging current control means 5, several solar batteries 10 to 16, and connecting wires 4 and 40 to 46.

In FIG. 1, the solar batteries 10, 11, 12, 13, 14, 15 and 16 are disposed, with the light sensitive surfaces facing outward, at several positions of the vehicle body 1, such as on the roof and inside the front, back, and side window glasses so as to obtain sunlight from all directions. As described below, the solar batteries are fixed by standard accessory fittings, for example, by suction cups, bonding plates or fixtures and, if necessary, by brackets. Therefore, at least one of the solar batteries thus disposed can effectively obtain solar energy regardless of the direction the vehicle is facing and of the position of the sun.

In addition to this, since each solar battery is disposed, as hereinafter fully described, on the roof or inside the passenger compartment of the vehicle body, it is possible to protect the solar batteries from external forces, damage, dirt, and splashes of mud, and thus the surfaces of the solar batteries are kept in good working condition for collecting solar energy.

Figure 2:
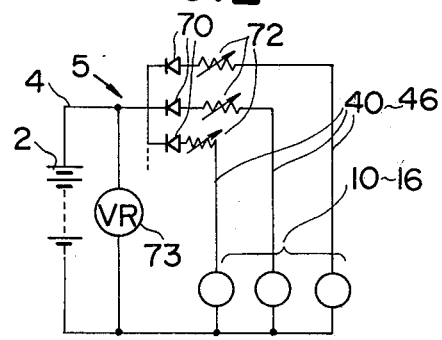
FIG. 2 is a wiring diagram illustrating the principle of the control means used for a battery recharging arrangement which includes a voltage regulator and other circuit components.

In a battery recharging arrangement of the present invention, a recharge control means 5 of the prior art is provided for effectively feeding the recharging current obtained from each of the solar batteries 10-16 to a battery 2 mounted in a vehicle body. FIG. 2 is a wiring diagram to illustrate the principle of the control means. The numerals 10-16 designate solar batteries, 4 and 40-46 wires, 2 a vehicle battery, 70 diodes, 72 variable resistors, and 73 designates a voltage regulator. The recharging current generated by the solar batteries 10-16 is fed to the voltage regulator 73 through diodes 70 and variable resistors 72 via wires 40-46 and then to the battery via a wire 4. In this case, single-core cables are used as the wires with the negative voltage sides grounded to the vehicle body.

FIGS. 3 to 10 show various positions where the solar batteries are disposed.

Figure 3:
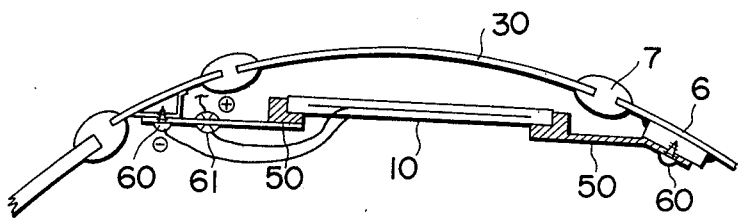
FIG. 3 is an enlarged vertical sectional schematic view of the roof of a vehicle, showing a solar battery positioned in an aperture in the roof.

FIG. 3 illustrates a solar battery positioned on the roof of a vehicle. In this figure, a window 30 is held in an aperture in the roof by a weather strip 7, and a solar battery 10 is fixed to the vehicle facing the window 30, by a supporting metal fixture 50 secured to the window frame by screws 60, the wire passing through a rubber grommet 61.

FIG. 4 illustrates a case where a solar battery 11 is fixed, facing the front windshield glass 32, by a supporting metal fixture 51 secured to the instrument metal panel by screws 60, the wire being passed through a rubber grommet 61.

FIG. 5 illustrates another case where a solar battery 12 is supported facing the front windshield glass 32 with a supporting metal fixture 54 mounted on a rear-view mirror support 52 through a ball joint 53. In this case, there is an advantage that the solar battery surface is readily adjusted to point to the sun from inside the passenger compartment.

FIG. 6 shows a case where a solar battery 13 is fixed to the side of the vehicle body. In this figure, a battery 13 is fixed inside the side window 33 near the upper end portion of a center pillar by an appropriate supporting metal fixture (not shown) mounted at the lower end of the roof 6 by screws 60.

Figure 8:
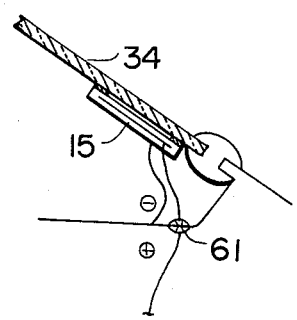

Similarly, FIGS. 7, 8, and 9 illustrate cases where solar batteries 14, 15, and 16 are fixed at the rear side of the vehicle body. In FIG. 7, a solar battery 14 is fixed inside the upper end of the rear windshield glass 34; in FIG. 8, a solar battery 15 is fixed inside the lower end of the rear windshield glass 34; in FIG. 9, a solar battery 16 is fixed on a rear shelf. In every case, these solar batteries are positioned facing toward the sun with appropriate fixtures to effectively utilize sunlight transmitted through the rear windshield glass 34.

Figure 10:
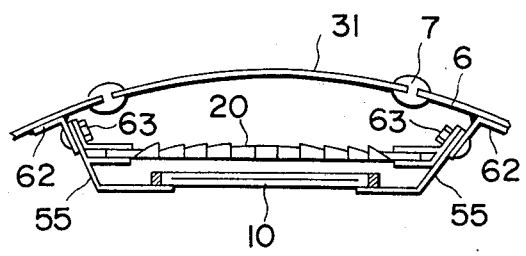
FIG. 10 is an enlarged vertical sectional schematic view of the roof of a vehicle, showing a Fresnel lens positioned over a solar battery.

For further improved light-collecting capability it is possible to provide an additional light focusing device, such as a Fresnel lens provided over each solar battery. FIG. 10 illustrates an embodiment of this case. In this figure, are provided a solar battery 10 and a Fresnel lens having a larger effective light-receiving surface than that of the solar battery as a light focusing device, both of which are supported by metal fixtures 55 secured by L-shaped fixtures 62 with bolts and nuts 63, which are all fixed to the inside surface of the roof 6. The Fresnel lens and solar battery are positioned facing a window glass 31 placed on the roof 6 with a weather strip 7, thus improving the sunlight collecting efficiency. It will be apparent that the same effect can be obtained also by suitably disposing mirrors around the solar battery.

As is apparent from the foregoing description, according to the present invention it is possible to recharge the vehicle battery by effectively utilizing solar energy whenever sunlight is available and wherever an automotive vehicle is running or is parked regardless of the positions of the sun. In addition, there is an advantage that the solar batteries positioned inside the roof window glass or within the passenger compartment are not subjected to damage, dirt, mud splashes.

Although the invention has been described in terms of a preferred embodiment with a certain degree of particularity, it is to be understood that this is merely an example of the present invention and the combination and arrangement of solar batteries and other parts may be changed without departing from the spirit and scope of the invention as hereinafter claimed. That is, the solar batteries may be disposed in positions other than the roof and the passenger compartment; for example, on the engine hood, trunk lid or the like with windows covering the solar batteries.

We claim:

1. An apparatus for recharging an automotive vehicle battery provided in an automotive vehicle comprising:
   a first solar battery being secured on a rear view mirror support provided inside of a vehicle compartment adjacent a front windshield, a universal joint means interpositioned between said rear view mirror support and said solar battery for permitting adjustment of direction of said solar battery toward sunlight; and
   a recharging current control means for feeding recharging current obtained from said solar battery to said vehicle battery.

2. An apparatus for recharging an automotive vehicle battery as defined in claim 1, further comprising:
   a second solar battery mounted at a position on which sunlight falls.

3. An apparatus for recharging an automotive battery as defined in claim 1, further comprising a light focusing device in the vicinity of said solar battery.

4. Apparatus for recharging an automotive battery as defined in claim 2, further comprising a light focusing device in the vicinity of at least one of said first and second solar batteries.

5. An apparatus for recharging an automotive vehicle battery as defined in claim 1, wherein said second solar battery is mounted on the roof of the automotive vehicle so as to be exposed to sunlight.

6. An apparatus for recharging an automotive vehicle battery as defined in claim 1, wherein said second solar battery is provided at a portion inside of the vehicle compartment where sunlight falls.

7. An apparatus for recharging an automotive vehicle battery as defined in claim 1, wherein said second solar battery is disposed in an aperture formed in the roof of the automotive vehicle and further comprising a transparent roof member through which said second solar battery is exposed to sunlight.

8. An apparatus for recharging an automotive battery as defined in claim 4, wherein said second solar battery is disposed facing the front windshield glass on an instrument panel at such an orientation to receive sunlight.

9. An apparatus for recharging an automotive battery as defined in claim 6, wherein said second solar battery is disposed inside the side window near the upper end portion of a center pillar.

10. An apparatus for recharging an automotive battery as defined in claim 6, wherein said second solar battery is disposed inside the rear windshield glass.

11. An apparatus for recharging an automotive battery as defined in claim 6, wherein said second solar battery is disposed on a rear shelf.

* * * * *